United States Patent [19]

Traynor

[11] Patent Number: 4,710,934
[45] Date of Patent: Dec. 1, 1987

[54] RANDOM ACCESS MEMORY WITH ERROR CORRECTION CAPABILITY

[75] Inventor: Kevin Traynor, Albuquerque, N. Mex.

[73] Assignee: Texas Instruments Incorporated, Dallas, Tex.

[21] Appl. No.: 796,367

[22] Filed: Nov. 8, 1985

[51] Int. Cl.$^4$ .................. G11C 29/00; G06F 11/10
[52] U.S. Cl. ................................. 371/38; 371/51
[58] Field of Search .................. 371/38, 51, 13, 21; 365/200

[56] References Cited

U.S. PATENT DOCUMENTS

| | | | |
|---|---|---|---|
| 4,335,458 | 6/1982 | Krol | 371/38 |
| 4,335,459 | 6/1982 | Miller | 371/38 |
| 4,394,763 | 7/1983 | Nagano | 371/38 |
| 4,456,996 | 6/1984 | Haas | 371/38 X |
| 4,542,454 | 9/1985 | Brcich | 371/38 X |

*Primary Examiner*—Jerry Smith
*Assistant Examiner*—Robert W. Beausoliel, Jr.

*Attorney, Agent, or Firm*—John G. Graham; Rodney M. Anderson

[57] ABSTRACT

A Random Access Memory with error detection/correction capability includes an information array (10) for storage of a collective data word in a single row thereof and a parity array (12) for storage of corresponding parity information in a single row thereof. A single row of the information array (10) and the parity array (12) are accessed and input to an error correct circuit (54). The collective data and parity information are also input to an error syndrome/parity generator (48), the output of which is input to the error correct circuit (54) to correct bits that are in error. A latch (72) is provided for latching the corrected information therein to allow new data to be written therein. The output of the latch (72) is multiplexed into the error syndrome/parity generator (48) which is configurable as a parity generator to generate new parity information for a write operation. The new collective data and parity information in the write mode are stored in arrays (10) and (12).

12 Claims, 9 Drawing Figures

FIG. 1

| P1 | P2 | D1 | P3 | D2 | D3 | D4 | P4 | D5 | D6 | - - - | D254 | D256 |
|----|----|----|----|----|----|----|----|----|-----|-------|------|------|
| M1 | M2 | M3 | M4 | M5 | M6 | M7 | M8 | M9 | M10 | - - - | M264 | M265 |

RANDOM ACCESS MEMORY WITH ERROR CORRECTION CAPABILITY

TECHNICAL FIELD OF THE INVENTION

The present invention pertains in general to semiconductor memories and, more particularly, to random access memories utilizing an error detection/correction code.

CROSS REFERENCE TO RELATED APPLICATION

This application is related to patent application Ser. Nos. 753,854, and 772,117.

BACKGROUND OF THE INVENTION

Advances in semiconductor technology and especially in the areas of semiconductor memories have led to higher semiconductor chip density and complexity. This results in tight geometries which have associated therewith process control problems occasionally resulting in failures in bit cells of the array. The failure etiology is frequently column related (as opposed to row related) resulting in defective columns of bit cells. However, the failure of a single bit in a large memory array of, for example, 64,000 memory, cells still constitutes a failure of the entire device.

To increase yield in a semiconductor memory array, such techniques as redundancy and error detection/correction schemes have been utilized. Redundancy is especially suited for repetitive circuits such as memory arrays wherein a portion of the circuits, such as a column of memory cells, is repeated on the chip. At test, it is then only necessary to either open a laser type fuse to insert the redundant circuit for the defective circuit or activate an electronic switching interface to make the replacement. One type of redundant circuit is discussed in U.S. Pat. No. 4,598,388, issued July 1, 1986 and assigned to Texas Instruments Incorporated. Another device is disclosed in U.S. Pat. No. 4,471,472, issued to E. S. Young on Sept. 11, 1984 and assigned to Advanced Microdevices, Inc. Redundant circuits, however, require a defined amount of silicon surface area or "overhead" for implementation thereof. In addition, redundant circuits must be activated during the manufacturing phase with the redundancy provided therefor constrained within the limits of the redundant circuit. Partial redundancy works well only with Read/Write memories. Read Only Memories (ROM's) need 100% redundancy.

The second technique for increasing yield on a high density semiconductor memory array is to utilize an error detecting and correcting code. Such codes usually contain two kinds of digits: information or message digits, and check or parity digits. Since the probability for the simultaneous appearance of two or more errors is much smaller than for single errors, attention is frequently focused on detecting and correcting only single bit errors. To implement an error detection/correction code, it is necessary not only to store the information digits but also to store corresponding parity information. The most widely used single error detecting code is the odd/even parity code, in which one parity bit is added to every code word. For the odd/even parity check, the additional bit is chosen so that the sum of all logic 1's and the data word, including this parity bit, is odd or even.

The odd/even parity error detecting code requires addition of an extra bit to each code word and is sometimes referred to as "horizontal" parity checking. If, however, the code words of a longer message are arranged in an array of n rows and m columns, then, besides the horizontal parity bit added to each row, another "vertical" parity bit may also be added to each column. This is referred to as a block parity error correcting code. The error can be detected either from the horizontal parity bit or from the vertical parity bit.

Another type of error correcting code is the Hamming code which is one of the more important single error detecting and correcting codes. This code cannot only detect and correct single error codes but can also detect double errors. Such devices have been developed for use external to a semiconductor memory. The data word output by the memory along with its parity information, is input to the error/detection circuit in order to detect if there is an error. If an error exists, this error is corrected and the corrected data word output therefrom. An error/detection circuit of this type is manufactured under the Part No. 2960 by Advanced Micro Devices. Examples of applications of other error detection/correction codes can be found in U.S. Pat. Nos. 4,479,214; 4,494,234; 4,497,058; 4,498,175; 4,506,365 and 4,468,769.

Although, error detection/correction codes provide the capability to correct single or multiple errors, integration of this capability into an integrated RAM presents some difficulties. It is necessary to both read corrected data from the memory and also generate the parity or check bits when writing data to the memory. The circuit overhead for this multiple Read/Write process can become cumbersome.

SUMMARY OF THE INVENTION

The present invention disclosed and claimed herein comprises an error detection/correction random access memory. The memory includes an array of memory elements for storing coded data words therein. Each of the coded data words is comprised of a collective data portion and associated parity information. The collective data portion is formed from a plurality of digital data words, arranged in a predetermined order. The parity portion is comprised of parity information associated with the collective data portion and generated in accordance with a block code error algorithm. Each of the coded data words is accessed by an external address. An error syndrome/parity generator is provided for operating in an error detection mode to receive one of the coded data words extracted from the array and output an error syndrome which indicates the bit position of any error existing in the coded data word. The error syndrome/parity generator also operates in a parity mode to receive the collective data portion of the coded data word and generate new parity information. In the error detection mode, the error syndrome is input to an error correction circuit to correct the bit in error in the coded data word from which the error syndrome was generated. The output of the error correcting circuit comprises a corrected coded data word.

In the Read mode, the error syndrome/parity generator is configured in the error detection mode and the coded data word extracted from the accessed location in the array and input to the error syndrome/parity generator. One of the digital data words in the collective data portion of the corrected coded data word is then extracted in accordance with an external data word location address. In the Write mode, the accessed one of the stored coded data words is first extracted and corrected to provide a corrected coded data word. The collective data portion of the corrected coded data word is then stored in a latch and one of the digital data words therein replaced with a new digital data word. The contents of the latch are then input to the error syndrome/parity means which is configured in the parity generation mode. The new parity information is then combined with the contents of the latch to form a new coded data word, this new coded data word then stored in the accessed location.

In another embodiment of the present invention, the width of the array is equal to the bit length of the coded data words. To access one of the coded data words from the array, only an external row address is required. Further, a refreshing mode is provided which requires only a row address to access one of the coded data words. The accessed coded data word is then extracted and corrected and the corrected data word then stored back in the accessed location. Sequentially incrementing the row address provides refreshing of all of the rows of memory elements.

BRIEF DESCRIPTION OF THE DRAWINGS

For a more complete understanding of the present invention and the advantages thereof, reference is now made to the following description, taken in conjunction with the accompanying Drawings, in which.

DETAILED DESCRIPTION OF THE INVENTION

Figure 1:
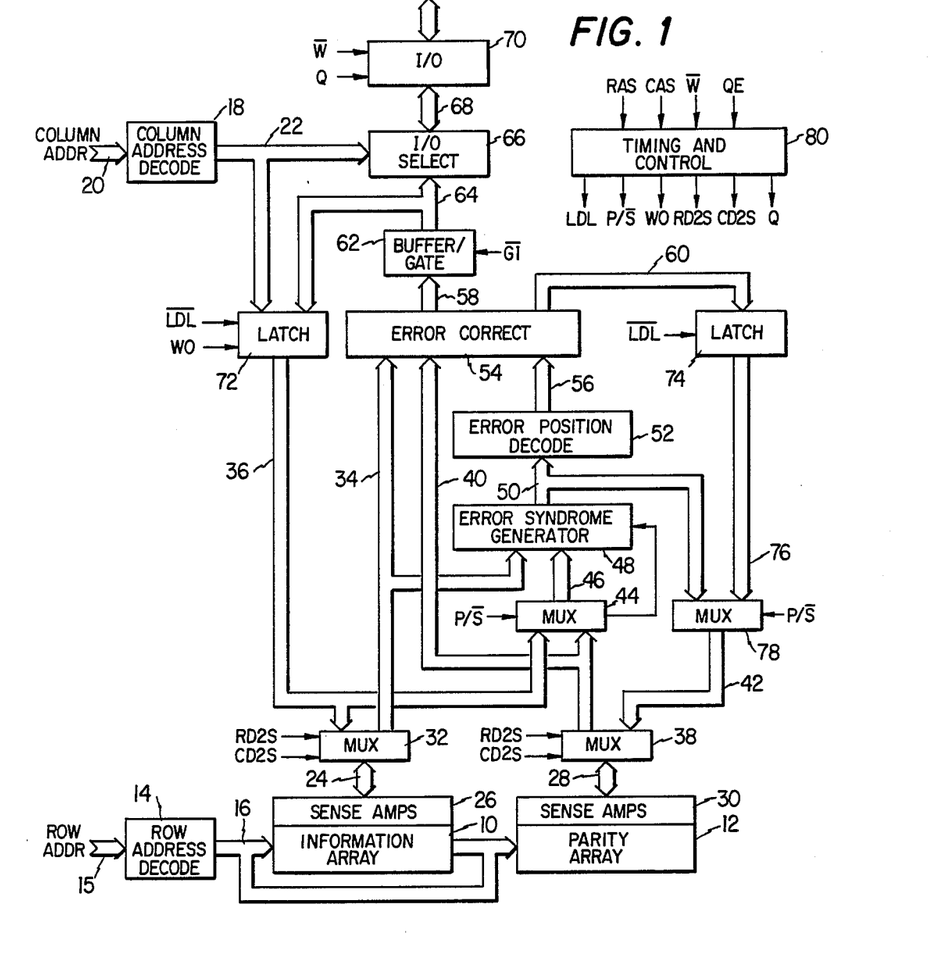
FIG. 1 llustrates a schematic block diagram of an error detection/correction Random Access Memory (RAM) of the present invention.

Referring now to FIG. 1, there is illustrated a schematic block diagram of a Random Access Semiconductor Memory (RAM) utilizing the error detection/correction circuitry of the present invention. However, the present invention is not limited to a RAM. The memory is comprised of an information memory array 10 and a parity memory array 12. Each of the arrays 10 and 12 is formed from an array of memory elements arranged in rows and columns. The typical structure of a RAM is illustrated in U.S. Pat. No. 4,330,852, issued May 18, 1982, to Redwine, et al. and U.S. Pat. No. 4,347,587, issued to Rao on Aug. 31, 1982, both assigned to Texas Instruments Incorporated. As will be described hereinbelow, information is extractable from the information array 10 and then corrected and also written into the information array with a corresponding generation of parity information for storage in the parity array 12.

Data is stored in the information array 10 in the form of multiple data words grouped into a single collective data word. In the preferred embodiment, the information array is two hundred fifty-six bits wide such that each collective data word is comprised of thirty-two eight-bit words. Therefore, each row of the information array 10 is comprised of a single collective data word.

Each of the collective data words has a predetermined number of "check bits" or "parity bits" associated therewith and stored in the parity array 12. The collective data word and its associated parity bits form a "coded data word". In order to read data, detect an error and correct this error, it is necessary to access both the collective data and the associated parity bits and process this coded data word with an appropriate error detection/correction algorithm. Alternatively, writing of data into the array requires generation of the parity bits for storage in the parity array 12.

Information array 10 is addressed by a column address and a row address. The row address is first latched into a row address latch (not shown) and then input to a row address decoder 14 on an address bus 15 to select one of a plurality of word lines which are represented by a word line bus 16. The output of the row address decoder 14 is mutually exclusive such that only one row in both the information array 10 and the parity array 12 is selected. The column address is first input to a column address latch (not shown) and then into a column address decoder 18 on a column address bus 20. The column address decoder 18 selects one or more of the columns of the array 10 through Y-select lines on a column select bus 22. In the preferred embodiment, the memory processes eight-bit words such that each Y-select line selects a group of eight columns. The data bits for a given eight-bit word are arranged such that no two adjacent bits are in adjacent columns. For example, data bit D0 of the first data word for a given row would be stored in column 00, the second data bit D1 would be stored in column 07, the third data bit D2 would be stored in column 15, etc.

After the row address is generated, the select word lines in the word line bus 16 activate a select row of two hundred fifty-six memory elements. This information is output to a 256-bit wide bus 24 through associated sense amps 26. Simultaneously, the associated parity information is output to a nine-bit wide bus 28 through associated sense amps 30, the parity information for a 256-bit collective data word being nine bits in width.

The collective data word on the bus 24 is input to a multiplexer 32. The multiplexer 32 is operable to interface information on the bus 24 with a data bus 34 for the Read operation. In addition, the multiplexer 32 is controllable to interface data on the data bus 36 with the data bus 24 to allow information to be input to the information array 10 during a Write or Refresh operation, as will be described hereinbelow. The parity information on the bus 28 is input to a multiplexer 38. The multiplexer 38 is operable to interface information on the bus 28 with a data bus 40 for the Read operation. During the Write and Refresh operation, parity information is received from a data bus 42 for input to the parity array 12 through data bus 28. The data bus 40 and the data bus 36 are both input to a multiplexer 44 for multiplexing with a data bus 46. In the Read Operation, data bus 40 is multiplexed to data bus 46. In the Refresh operation, as will be described hereinbelow, the data bus 36 is mutliplexed to the data bus 46.

The collective data word on data bus 34 and the parity bits on the bus 40 during the Read operation are input to an error syndrome/parity generator 48. The error syndrome generator 48 is operable in an error correction mode to receive a coded data word and generate an error syndrome in accordance with the predetermined error detection/correction algorithm to determine which bit, if any, in the accessed coded data word is in error. The error syndrome/parity generator 48 also operates in a parity mode to receive a collective data word and generate new parity information, as will be described hereinbelow.

In the error correction mode, the error syndrome is generated and output on an error syndrome bus 50 for input to an error position decode circuit 52. The output of the error position decode circuit 52 is input to an error correction circuit 54 on a bus 56. The collective data word on the bus 34 and the parity information on the bus 40 during the Read operation are also input to the error correction circuit 54. The error correction circuit 54 outputs the corrected collective data word onto a 256-bit wide data bus 58 and the corrected parity bits onto a data bus 60. The bus 58 is input to a buffer/gate circuit 62 for interfacing the corrected collective data to a 256-bit wide output data bus 64. The buffer/gate circuit 62 is a tri-state device such that the bus 58 can be either isolated from the bus 64 or connected thereto for transfer of information from the error correction circuit 54 to the bus 64.

The data bus 64 is interfaced with an input/output (I/O) select circuit 66. The I/O select circuit 66 is controlled by the Y-select lines from the select bus 22 to select one of the data words in the 256-bit collective data word. For the Read operation, a select one of the eight-bit data words that form the 256-bit collective data word is transferred from the bus 64 to an eight-bit I/O bus 68 and, for the Write operation, information is tranferred from the bus 68 to bus 64. The bus 68 is interfaced with the exterior of the chip through an I/O circuit 70 which is controlled by the $\overline{W}$ signal and the Q output enable signal to either input data thereto or output data therefrom.

The data bus 64 is also input to a latch 72. The latch 72 is operable in one mode to latch all two hundred fifty-six bits of information from the bus 64 in response to receiving an $\overline{LDL}$ signal. In addition, the latch 72 also receives the Y-select lines from the bus 22 to control the latch 72 to "write over" relected information in the latch 72 during the Write operation. As will be described hereinbelow, an eight-bit data word is input to the I/O select circuit 66 from the bus 68 and interfaced with the corresponding lines of the bus 64 in accordance with the Y-select line activated by the column address decode 18. During this time, the buffer/gate circuit 62 isolates the bus 64 from the output of the error correct circuit 54 such that information is only input to the latch 72. This information is then written over the corresponding bits in the latch 72. The output of the latch 72 is interfaced with the bus 36 for input of the latched data to either the information array 10 during the Write operation or the input of the multiplexer 44 for multiplexing to the error syndrome/parity generator 48 during the Refresh operation, as will be described hereinbelow.

The data bus 60 carrying the corrected parity information is input to a latch 74. The latch 74 outputs the latched data on a bus 76 to the input of a multiplexer 78. The multiplexer 78 has the output thereof connected to the bus 42 and also receives an input from the error syndrome bus 50. The multiplexer 78 is operable during the refresh cycle to connect the latched data on the bus 76 to the bus 42 and, during the Write operation to interface new parity information with the bus 42.

In order to control the operation of the circuit, various timing and control signals are generated by a timing and control circuit 80. The timing and control circuit 80 receives the row address strobe AS)/ , the column address strobe ($\overline{CAS}$), the Write signal ($\overline{W}$) and the output enable (QE) signal. The timing and control circuit 80 generates all the control signals necessary to allow information to be accessed from the information array 10, detected and corrected and to also allow information to be written to the information array 10 with subsequent generation of parity information for input to the parity array 12.

For operation of the circuit of FIG. 1, the bit length of the data stored in the information array 10 is longer than the bit length of a single data word. Therefore, the block code error detection/correction algorithm in the error syndrome/parity generator 48 operates on a larger number of data bits than are required for a conventional error correcting scheme. As will be described hereinbelow, this requires less parity bits and, thus, less storage is required in the parity memory array 12.

During the read operation, a full row of data is accessed from the information array 10 and multiplexed onto the bus 34. Simultaneously, the corresponding nine bits of parity information of the array 12 are multiplexed onto the bus 46 with multiplexers 38 and 44 for input to the error syndrome generator 48. The error syndrome generator 48 outputs an error syndrome on error syndrome bus 50 which is decoded by the error position decode circuit 52 to determine which, if any, bits in the coded data word on the buses 34 and 40 are in error. This information is utilized and input to the error correction circuit 54 to correct the error in the coded data word which has an information portion that is two hundred fifty-six bits long and a parity portion which is nine bits long. The information portion is output on the 256 bit wide bus 58 and the parity portion output on the bus 60. The information portion on the bus 58 is input to the bus 64 through the buffer/gate circuit 62 then and the select data word in the two hundred fifty-six bit corrected collective data word is output from the I/O circuit 70.

In the Write operation, it is first necessary to access a row of information from the array 10, correct it and store it in the latch 72. An eight-bit word is then input to the bus 64 from the I/O select circuit 66 and this information utilized to replace the select data bits in the latch 72 that were selected by the I/O select circuit 66 in accordance with the column address. This forms a new collective data word which is then written to the array 10 and the corresponding parity information generated and stored in the parity array 12.

To initiate the Write operation, information is first accessed similar to the read operation described above and then corrected, the corrected collective data word is then stored in the latch 72. The buffer/gate 62 is then placed in the high impedence state and a new eight-bit data word then input through the I/O circuit 66 to the bus 64 on eight select lines of the two hundred fifty-six lines in the bus 64. These new eight-bits of the data are then written over the corresponding latch bits in the latch 72 for output on the bus 36. Since this collective data word is new and does not correspond to the information currently presiding in the addressed one of the rows in the array 10, it is necessary to generate new parity information. The multiplexer 44 is controlled to input the new information on the data bus 36 to the error syndrome/parity generator 48 and the error syndrome/parity generator 48 reconfigured to generate parity information onto the bus 50. The multiplexer 78 is also controlled to connect the bus 50 to the bus 42. Once new information is placed on the bus 36 and new parity information is generated onto the bus 42, the multiplexers 32 and 38 select buses 36 and 42, respectively, for input to the respective arrays 10 and 12.

In the Refresh operation, it is necessary to periodically read the data from the information and parity arrays 10 and 12, correct this data and then rewrite it to the respective arrays. In the Refresh operation, the information is read from the arrays 10 and 12 and corrected such that the corrected collective data word is latched into latch 72 and the corrected parity information is latched into latch 74. Multiplexers 32, 44 and 78 are then controlled to apply the corrected collective data word to information array 10 and the corrected parity information to parity array 12.

The block code error detect/correct algorithm utilized in the preferred embodiment is a Hamming single error detecting and correcting code. However, it should be understood that some suitable block code, such as a Reed-Muller or Golay code, could be utilized. The error syndrome output on bus 50 contains information regarding the error in the form of the relative position within the 256 bit collective data word accessed and output on data bus 34. It is then only necessary to invert the bit in error to output a corrected data word. The error correction circuit 54 facilitates this correction and the I/O select circuit 66 selects a smaller segment data word for output onto bus 68 in accordance with the column address on bus 20. In this manner, an eight-bit data word can be output with the error correction being performed on a 256 bit data word. This results in a smaller number of parity bits to perform the error correction. For example, a 256-bit word would require only nine parity bits whereas thirty-two eight-bit data words would require four parity bits each for a total of one hundred twenty-eight parity bits.

In order to better describe the operation of the present invention, a description of the Hamming code will be undertaken. As described above, the Hamming code is a single error detecting and correcting code which is sometimes referred to as a "distance-3" code which can also detect double errors. The Hamming code is formed by first determining the number of check bits or parity bits required. In each binary message of n information bits($D_n$, $D_{n-1}$, ... $D_1$) to be transmitted, k parity bits ($P_k$, $P_{k-1}$ ... $P_1$) are added for checking even (or odd) parity over various combinations of information bits. In the preferred embodiment, even parity is utilized. Thus, a composite or "coded" message of n+k bits is formed. The parity bits $P_i$ (i equals 1, 2, ... k) occupy specific positions in the coded (n+k−bit message). Although the collective data word and associated parity bits were described with reference to FIGS. 1 and 2 as being organized in a separate information array 10 and separate parity array 12, in practice, these would be interleaved as a "coded message". These positions are 1, 2, 4, 8, ... $2^{k-1}$, i.e., positions that are integer powers of 2. The value of each $P_k$ is determined by checking the parity of specific data bits ($D_1$, $D_2$ ... $D_n$) in the original data message as shown in Table 1 for coded messages ($M_1$, $M_2$, ... $M_{n+k}$) of up to fifteen bits with eleven data and four parity bits. Thus, the parity bit $P_1$ checks all data bits in the odd positions of the coded message, 1, 3, 5, 7, ...; the parity bit $P_2$ check the pair sets of positions (2, 3), (6, 7) (10, 11) ...; the parity bit $P_3$ checks quadruple sets of positions; etc.

TABLE 1

| Parity Bits | Data Bit Locations |
|---|---|
| $P_1$ | $M_3$, $M_5$, $M_7$, $M_9$, $M_{11}$, $M_{13}$, $M_{15}$ |
| $P_2$ | $M_3$, $M_6$, $M_7$, $M_{10}$, $M_{11}$, $M_{14}$, $M_{15}$ |
| $P_3$ | $M_5$, $M_6$, $M_7$, $M_{12}$, $M_{13}$, $M_{14}$, $M_{15}$ |
| $P_4$ | $M_9$, $M_{10}$, $M_{11}$, $M_{12}$, $M_{13}$, $M_{14}$, $M_{15}$ |

The number of parity bits required for a given message length is given in Table 2. For example, if the original message is a binary coded decimal code (BCD) code word with n set equal to 4, three parity bits will be required with k equal to 3. This requires that positions 1, 2 and 4 in the coded message $M_{n+k}$ have the parity bits $P_1$, $P_2$ and $P_3$ inserted therefor. Thus, the transmitted Hamming code message will be seven bits long, as shown in Table 3 for the ten BCD code words, assuming even parity.

TABLE 2

| Number of Bits in Data Word $D_n$ | Minimum Number of Parity Bits $P_k$ | Total Length of Coded Message $M_{n+k}$ |
|---|---|---|
| 1 | 2 | 3 |
| 2–4 | 3 | 5–7 |
| 5–11 | 4 | 9–15 |
| 12–26 | 5 | 16–31 |
| 27–56 | 6 | 32–63 |

TABLE 3

| Decimal Digit | Position: BCD Position: Parity Bits: | 7 $D_4$ | 6 $D_3$ | 5 $D_2$ | 4 $D_1$ $P_3$ | 3 | 2 $P_2$ | 1 $P_1$ |
|---|---|---|---|---|---|---|---|---|
| 0 | | 0 | 0 | 0 | 0 | 0 | 0 | 0 |
| 1 | | 0 | 0 | 0 | 0 | 1 | 1 | 1 |
| 2 | | 0 | 0 | 1 | 1 | 0 | 0 | 1 |
| 3 | | 0 | 0 | 1 | 1 | 1 | 1 | 0 |
| 4 | | 0 | 1 | 0 | 1 | 0 | 1 | 0 |
| 5 | | 0 | 1 | 0 | 1 | 1 | 0 | 1 |
| 6 | | 0 | 1 | 1 | 0 | 0 | 1 | 1 |
| 7 | | 0 | 1 | 1 | 0 | 1 | 0 | 0 |
| 8 | | 1 | 0 | 0 | 1 | 0 | 1 | 1 |
| 9 | | 1 | 0 | 0 | 1 | 1 | 0 | 0 |

When the coded message is examined, the same parity is then applied to the received coded message $M_{n+k}$. A "checking number", "position number" or "syndrome number" S ($S_k S_{k-1} ... S_2 S_1$) is formed, such that, if no error is detected then S will have a value equal to zero. If, however, a single bit error is detected, then the decimal value of the binary number for $S_k$ will correspond to the position of the received message when the error occurred. This parity checking is illustrated in Table 4 wherein the positions $M_1$, $M_2$, $M_4$ and $M_8$ in the coded word correspond to the parity bits $P_1$, $P_2$, $P_3$ and $P_4$.

TABLE 4

| Syndrome number $S_k$ | Bit Locations Examined in Coded Message $M_{n+k}$ |
|---|---|
| $S_1$ | ($M_1$), ($M_3$), ($M_5$), ($M_7$), ($M_9$), ... |
| $S_2$ | ($M_2$, $M_3$), ($M_6$, $M_7$), ($M_{10}$, $M_{11}$), ($M_{14}$, $M_{15}$), ... |
| $S_3$ | ($M_4$, $M_5$, $M_6$, $M_7$), ($M_{12}$, $M_{13}$, $M_{14}$, $M_{15}$), ... |

TABLE 4-continued

| Syndrome number $S_k$ | Bit Locations Examined in Coded Message $M_{n+k}$ |
|---|---|
| $S_4$ | $(M_8, M_9, M_{10}, M_{11}, M_{12}, M_{13}, M_{14}, M_{15}), \ldots$ |

If the syndrome number $S_k$ specifies the position where an error appeared, then the various bits $S_j$ must check specific positions in the coded message $M_{n+k}$. If an error appears in an odd position (1, 3, 5, 7, 9, 11, ... ) in the coded message, then the least significant bit $S_1$ of the syndrome number $S_k$ must be equal to 1. If the coding was done such that in each Hamming code message all odd positions 1, 3, 5, 7, 9, 11, ... have even parity, then a single error in one of these positions will form an odd parity. In this case, the least significant bit $S_1$ of the syndrome number will take the value of 1. If no error appears in these positions, then the parity check will show even parity and $S_1$ will take the value of a zero. Similarly, the appearance of a single error in one of the positions 2, 3, 6, 7, 10, 11, ... will indicate $S_2=1$, otherwise $S_2=0$, etc. Table 4 illustrates the specific positions of the received messages $M_{n+k}$ examined by the respective $S_j$'s. With $K$ such position number bits, $2^k$ different syndrome numbers $S$ may be formed, where $2^k \geq n+k+1$. If, for example, the position number in the BCD messages using the Hamming code of Table 3 is $S=S_3 S_2 S_1 =$ "110", this signifies the appearance of an error in position $M_6$ of the received message, which in turn can then be corrected. If $S=0$, this implies that the message was received correctly.

To check the Hamming Code message with even parity for errors, it is necessary to compute the modulo-2 sum:

$$S_j = \Sigma \, M_j,$$

where $M_j$ represents the respective position bits of the received message to which the check $S_j$ is applied. If no error exists in the $M_j$ bits, then $S_j=0$, otherwise $S_j=1$. This procedures repeats for all $j=1, 2, 3, \ldots$ To further illustrate the Hamming code, Table 5 illustrates the Hamming code generation for a six bit message "101011", using even parity. The initial message is $D_6 D_5 \ldots D_1 = 101011$. Since n equals 6, it requires $k=4$ ($P_4 P_3 P_2 P_1$) parity bits, and it will thus be converted into a ten-bit Hamming code message. These parity bits $P_4$, $P_3$, $P_2$ and $P_1$ are placed in positions 8, 4, 2, 1, respectively, of the coded message M, respectively. The parity bits $P_1$–$P_4$ are determined by taking the modulo-2-sum, which operation is indicated by a "+" sign.

TABLE 5

| Coded Message Bit Positions: | $M_{10}$ | $M_9$ | $M_8$ | $M_7$ | $M_6$ | $M_5$ | $M_4$ | $M_3$ | $M_2$ | $M_1$ |
|---|---|---|---|---|---|---|---|---|---|---|
| Original Message Bit Positions: | $D_6$ | $D_5$ | | $D_4$ | $D_3$ | $D_2$ | | $D_1$ | | |
| Even Parity Bit Positions: | | | $P_4$ | | | | $P_3$ | | $P_2$ | $P_1$ |
| Original Data Message $D_n$: | 1 | 0 | | 1 | 0 | 1 | | 1 | | |
| $P_1 = M_3 + M_5 + M_7 + M_9 = 1$: | 1 | 0 | | 1 | 0 | 1 | | 1 | | 1 |
| $P_2 = M_3 + M_6 + M_7 + M_{10} = 1$: | 1 | 0 | | 1 | 0 | 1 | | 1 | 1 | 1 |
| $P_3 = M_5 + M_6 + M_7 = 0$: | 1 | 0 | | 1 | 0 | 1 | 0 | 1 | 1 | 1 |
| $P_4 = M_9 + M_{10} = 1$: | 1 | 0 | 1 | 1 | 0 | 1 | 0 | 1 | 1 | 1 |
| Hamming Code Message M: | 1 | 0 | 1 | 1 | 0 | 1 | 0 | 1 | 1 | 1 |

To check the message M with an error in, for example, position 6, the message M will be output as 1011110111 instead of 1011010111. The syndrome generator bits are generated as follows:

$$S_1 = M_1 + M_3 + M_5 + M_7 + M_9 = 0$$

$$S_2 = M_2 + M_3 + M_6 + M_7 + M_{10} = 1$$

$$S_3 = M_4 + M_5 + M_6 + M_7 = 1$$

$$S_4 = M_8 + M_9 + M_{10} = 0$$

The syndrome number thus formed is $S = S_4 S_3 S_2 S_1 = 0110$. Its decimal value is 6, which indicates that an error exists in position 6 of the received message. This error can be corrected by changing bit $M_6$ from 1 to 0.

Figure 2:
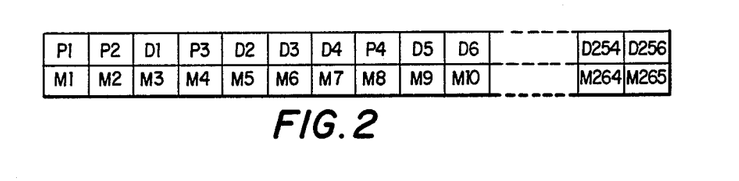
FIG. 2 illustrates the arrangement of data and parity bits stored in, the memory.

Referring now to FIG. 2, there is illustrated a diagram of the actual arrangement of the data bits $D_1$–$D_{256}$ in the collective data word and the parity bits $P_1$–$P_9$ with their relative positions in the coded message M having bits $M_1$–$M_{265}$. Since the Hamming code requires the insertion of the parity bits in predetermined positions, the memory information array 10 and parity memory array 12 are interleaved such that the relative position of the bits is reflected in the physical layout of the arrays. Therefore, the array is arranged such that the sense amps 26 and 30 are common and select a 265-bit word representing the coded message M which has the parity bits intertwined at positions $M_1$, $M_2$, $M_4$, $M_8$, $M_{16}$, $M_{32}$, $M_{64}$, $M_{128}$ and $M_{256}$. The separation of the parity bits and the collective data bits is facilitated by hardwiring the inputs of the sense amps 26 and 30 to the appropriate bit line.

As described above, in the preferred embodiment, the data information is comprised of an eight-bit word and, for purposes of error correction, thirty-two of the eight-bit data words are grouped together in a 256-bit collective data word. This is combined with nine bits of parity information to form the 265-bit coded message M. The parity bits are disposed in this message at positions 1, 2, 4, 8, 16, 32, 64, 128 and 256 and are derived by establishing parity over the associated bits in the coded message as illustrated in Table 6. To generate the syndrome bits $S_1$–$S_9$, bits associated with each of the syndrome bits $S_1$–$S_9$ are combined with an exclusive OR function, as illustrated in Table 7. The parity bits $P_1$–$P_9$ are illustrated in parentheses next to their respective positions.

TABLE 6

| Parity Bits | Bit Position of Data Bits in Coded Message |
|---|---|
| $P_1 =$ | 3,5,7,9,11,13,15,17,19,21,23,25,27,29,31,33,35,37, ... |
| $P_2 =$ | 3,6,7,10,11,14,15,18,19, ... 30,31,34,35,38,39, ... |
| $P_3 =$ | 5,6,7,12,13,14,15,20,21, ... 29,30,31,36,37,38,39, ... |
| $P_4 =$ | 9,10,11,12,13,14,15,24,25, ... 28,29,30,31,40,41,42, ... |
| $P_5 =$ | 17,18,19,20,21,22, ... 28,29,30,31,48,49,50,51, ... |
| $P_6 =$ | 33,34,35,36,37,38,39, ... 42,43,44,45, ... 63,128,129, ... |
| $P_7 =$ | 65,66,67,68,69,70,71,72 |
| $P_8 =$ | 124,130,131,132,133,134 ... 255 |
| $P_9 =$ | 257,258,259,260,261,262,263,264,265 |

TABLE 7

| Syndrome Bits | Bit Position of Data and Parity Bits in Coded Message |
|---|---|
| $S_1 =$ | 1($P_1$),3,5,7,9,11,13,15,17, . . . 25,27,29,31,33,35,37 |
| $S_2 =$ | 2($P_2$),3,6,7,10,11,14,15, . . .22,23,26,27,30,31,34,35,38 |
| $S_3 =$ | 4($P_3$),5,6,7,12,13,14,15, . . .23,28,29,30,31,36,37,38 |
| $S_4 =$ | 8($P_4$),9,10,11,12,13,14,15,24,25,26,27,28,29,30,31 |
| $S_5 =$ | 16($P_5$),17,18,19,20,21,22,23,24,25,26,27,28,29,30,31 |
| $S_6 =$ | 32($P_6$),32,33,34,35,36,37,38 |
| $S_7 =$ | 64($P_7$), . . . |
| $S_8 =$ | 128($P_8$), . . . |
| $S_9 =$ | 256($P_9$),257,258,259 |

If no errors are detected in the coded message, the error syndrome ($S_9 S_8 S_7 S_6 S_5 S_4 S_3 S_2 S_1$) will have a decimal value equal to zero. If there is a single bit error in the coded message, then the error syndrome will point to the defective bit. However, if a double error occurs, information read from the memory will contain multiple errors resulting in an unpredictable syndrome number. The error correcting capability of any Hamming code is equal to one bit; that is the Hamming code can detect and correct only a single bit error. Hamming codes are capable of detecting but not correcting two single bit errors. However, it should be understood that other types of error detection/correction codes can be utilized that are capable of correcting more than one error.

Figure 3:
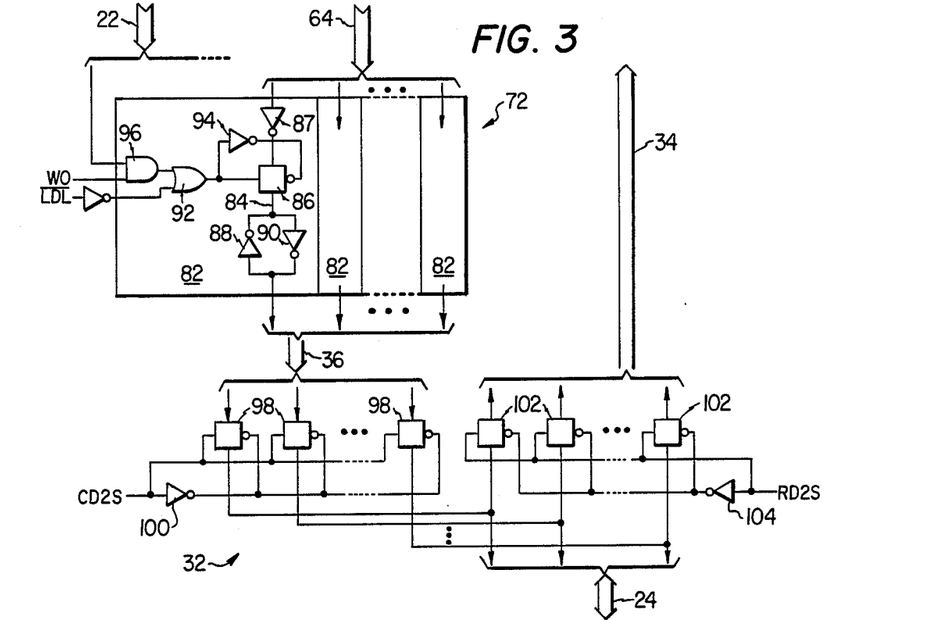
FIG. 3 illustrates a schematic block diagram of the multiplexing and latching portion of the memory.

Referring now to FIG. 3, there is illustated a schematic diagram of the latch 72 and multiplexer 32. The latch 72 is comprised of two hundred fifty-six latch bits 82, of which only one is illustrated in detail. Each of the latch bits 82 has a storage node 84 for storing a data bit thereat. The node 84 is connected to one bit of the data bus 64 through a transfer gate 86 and inverter 87. The transfer gate 86 is operable to either connect the bus 64 with the respective latch bits 82 or isolate it therefrom. The latching nodes are comprised of an inverter 88 having the input connected to the node 84 and the output thereof connected to the bus 36, and an inverter 90 having the input thereof connected to the bus 36 and the output thereof connected to the node 84. Any type of latching circuit can be utilized for the latch bit 82. Transfer gate 86 has a true and compliment input. The true input thereof is connected to the output of an OR gate 92 and the compliment input is connected to the output of the OR gate 92 through an inverter 94. One input of the OR gate 92 is connected to the load latch signal ($\overline{LDL}$) through an inverter and the other input thereof is connected to the output of an AND gate 96. One input of the AND gate 96 is connected to the Write Over signal (WO) and the other input thereof is connected to one of the Y-select lines from the bus 22. In operation, eight of the latches will be controlled by one of the NOR gates 92 such that a bank of eight latch bits 82 can be selected. In both the Refresh mode and the first portion of the Write mode, the latch 72 can be loaded with the e,ovs/LDL/ signal. In the second part of the Write mode wherein new data is written over the 256-bit prior collective data word, the WO signal overrides the e,ovs/LDL/ signal and the select bits, as defined by the select one of the Y-select lines, are written over.

The multiplexer 32 is comprised of transfer gates 98 associated with each of the two hundred fifty-six lines in the bus 36 and each of the two hundred fifty-six lines in the bus 24. Data is transferred from the bus 36 to the bus 24. Each of the transfer gates 98 has a true and a complementary input, the true input is connected directly to a control signal CD2S and the complementary input connected to the CD2S control signal through an inverter 100. A series of transfer gates 102 are connected between each of the two hundred fifty-six lines of the bus 24 and each of the two hundred fifty-six lines in the bus 34. Transfer gates 102 are operable to transmit data during the Read and Refresh modes from the bus 24 to the bus 34. The true input of each of the gates 102 is connected to a control signal RD2S and the complimentary inputs thereof are connected to the RD2S control signals through an inverter 104. The multiplexers 38–44 and 78 are configured similar to the multiplexer 32 with the multiplexer 38 controlled by the RD2S and CD2S control signals and the multplexers 44 and 78 controlled by a parity/syndrome select signal (P/S).

Figure 4:
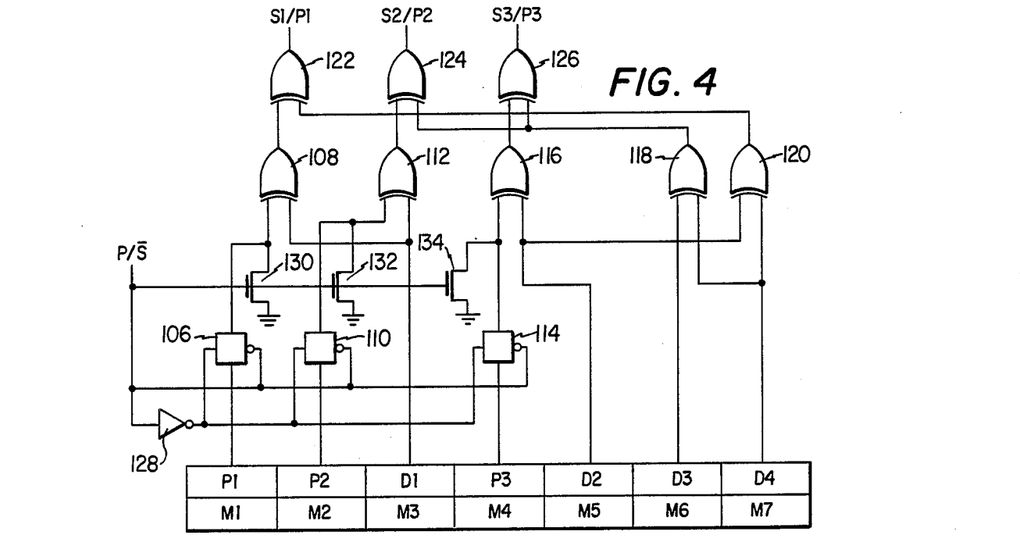
FIG. 4 illustrates a logic diagram of the combined syndrome and parity bit generator for generating both the error syndrome and the parity bits.

Referring now to FIG. 4, there is illustrated a schematic block diagram of a representative syndrome generator which is reconfigurable as a parity generator. For simplicity purposes, the syndrome generator of FIG. 4 is illustrated for use with a seven bit coded word wherein the information portion is four bits wide and the parity portion is three bits wide. The data word has data bits D1, D2, D3 and D4 with the three parity bits being labeled P1, P2 and P3. The parity bits and syndrome bits are generated in accordance with Tables 8 and 9 wherein the plus sign separating the various data and parity bits represents an exclusive OR function.

TABLE 8

| Parity Bits | Data Bits |
|---|---|
| P1 = | D3 + D5 + D7 |
| P2 = | D3 + D6 + D7 |
| P3 = | D5 + D6 + D7 |

TABLE 9

| Syndrome Bits | Message Bits |
|---|---|
| S1 = | P1 + D3 + D5 + D7 |
| S2 = | P2 + D3 + D6 + D7 |
| S3 = | P3 + D5 + D6 + D7 |

The parity bits P1–P3 and the data bits D1–D4 are illustrated proximate their associated message positions M1–M7. The parity bit P1 in the first message position is input to a transfer gate 106, the output of which is connected to one input of an exclusive OR gate 108. The second parity bit P2 and the second message position is input to a transfer gate 110, the output of which is connected to one input of an exclusive OR gate 112. The first data bit D1 in the third message position is connected to the other input of both the exclusive OR gate 108 and the exclusive OR gate 112. The third parity bit P3 in the fourth message position is input to a transfer gate 114, the output of which is connected to one input of an exclusive OR gate 116. The second data bit D2 in the fifth message position is connected to the other input of the exclusive OR gate 116. The third data bit D3 in the sixth message position is connected to one input of an exclusive OR gate 118 and the fourth data bit D4 in the seventh message position is connected to one input of an exclusive OR gate 120 and the other input of the exclusive OR gate 118. The other input of the exclusive OR gate 120 is connected to the second data bit D2 in the fifth message position. The output of exclusive OR gates 108 and 120 is connected to the two inputs of an exclusive OR gate 122. The outputs of the exclusive OR gates 112 and 118 are connected to the inputs of an exclusive OR gate 124 and the outputs of exclusive OR gates 116 and 118 are connected to respective inputs of an exclusive OR gate 126. The output of the exclusive OR gate 122 comprises the first syndrome bit S1 or, in the reconfigured state, the first parity bit P1, the output being labeled S1/P1. In a similar manner, the output of exclusive OR gate 124 is labeled S2/P2 and the output of exclusive OR gate 126 is labeled S3/P3, corresponding to the second and third syndrome bits and the second and third parity bits, respectively.

The transfer gates 106, 110 and 114 have the complementary inputs connected to the P/$\overline{S}$ signal and the true inputs thereof connected to the P/e,ovs/S/ signal through an inverter 128. The output of each of the transfer gates 106, 110, 114 have the outputs thereof gated to ground as a function of the P/$\overline{S}$ signal through n-channel transistors 130, 132 and 134, respectively. The gates of each of the transistors 130-134 is connected to the P/$\overline{S}$ signal.

In operation, the transfer gates 106, 110 and 114 are placed in a conducting mode and the transistors 130-134 are opened to configure the circuit of FIG. 4 as a syndrome generator. This essentially provides the exclusive OR function defined in Table 9. When the P/$\overline{S}$ signal goes high, the circuit of FIG. 4 is configured as a parity generator. In this mode, the parity bits in positions M1, M2 and M4 are opened and the outputs of the transfer gates 106, 110 and 114 are shorted to ground. This will provide the function illustrated in Table 8 Therefore, in the Write mode, the data output from the latch 72 can be processed through the error syndrome/parity generator 48 to generate parity information for storage in the parity array 12. By utilizing a dual function for the error syndrome generator, lower silicon overhead results.

Figure 5:
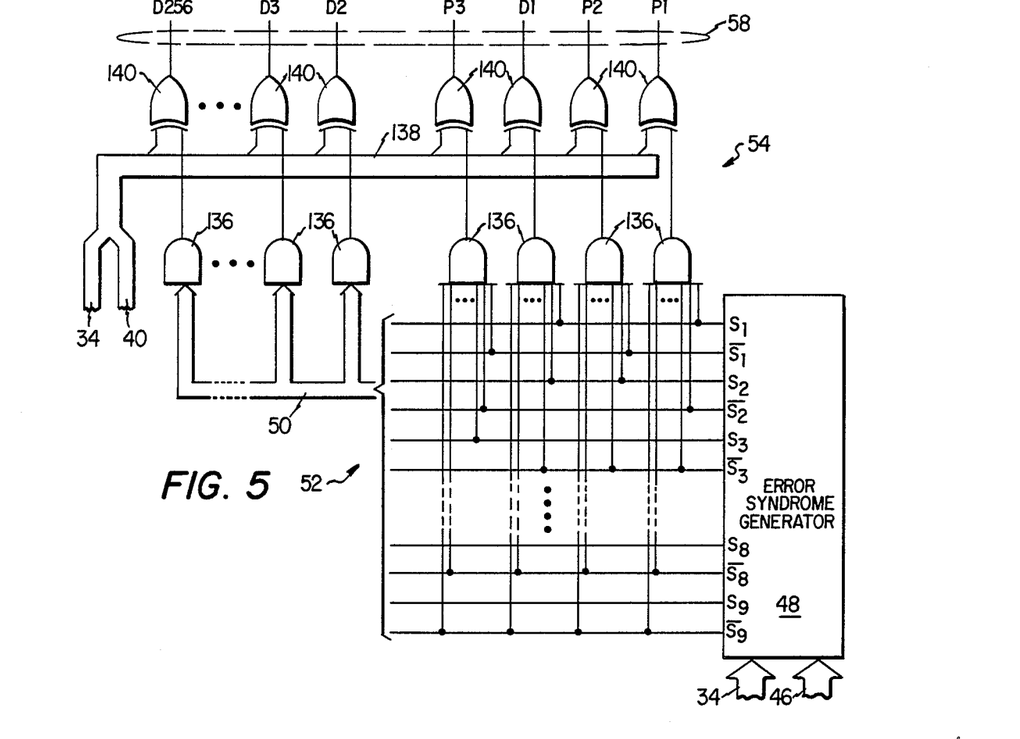
FIG. 5 illustrates a logic diagram for the error correcting circuitry.

Referring now to FIG. 5, there is illustrated a schematic diagram of the error position decode circuit 52 and error correction circuit 54. The syndrome/parity generator 48 outputs both the true and the compliment form of the syndrome bits $S_1$–$S_9$. Each of the bit positions in the coded data word is decoded by a multiple input AND gate 136.

The AND gate 136, associated with the first bit at position $M_1$ comprised of the parity bit $P_1$ of the coded data word, has nine inputs. The nine inputs thereof are connected to the error syndrome bus 50. Of the nine inputs, one is connected to $S_1$ and the remaining are connected to the inverse thereof; that is, the second input is connected to the inverse of 52, etc. Therefore, when the error syndrome generator 48 generates a nine-bit word having the first bit thereof high and the remaining bits low, this indicates the decimal value of "1." This corresponds to position $M_1$ and the associated AND gate 136 will select therefor. In a similar manner, nine input AND gates 136 are provided for position $M_2$ comprised of parity bit $P_2$, position $M_3$ comprised of data bit $D_1$ and position $M_4$ comprised of parity bit $P_3$. The remaining positions $M_5$–$M_{265}$ also have six input AND gates 136 associated therewith.

The data bus 34 with the 256 bit collective data word thereon and the data bus 40 with the nine bits of parity information thereon are combined into a single data bus 138. Each bit of the data bus 138 is input to an exclusive OR gates 140. The other input of the exclusive OR gate 140 is associated with one of the AND gates 136 and the associated one of the output positions $M_1$–$M_{265}$. For example, the output of the exclusive OR gate 140 associated with the AND gate 136 corresponds to position $M_1$ comprised of parity bit $P_1$. The exclusive OR gates 140 provide the data inversion if the output of the respective AND gates 136 is high, this indicating an error. For example, if the output of the associated one of the AND gates 136 is high, this indicates an error and the output will be the inversion of the input connected to the data bus 138. The output on bus 58 will therefore constitute a corrected data word and associated parity bits, provided only a single bit error has occurred.

Figure 6:
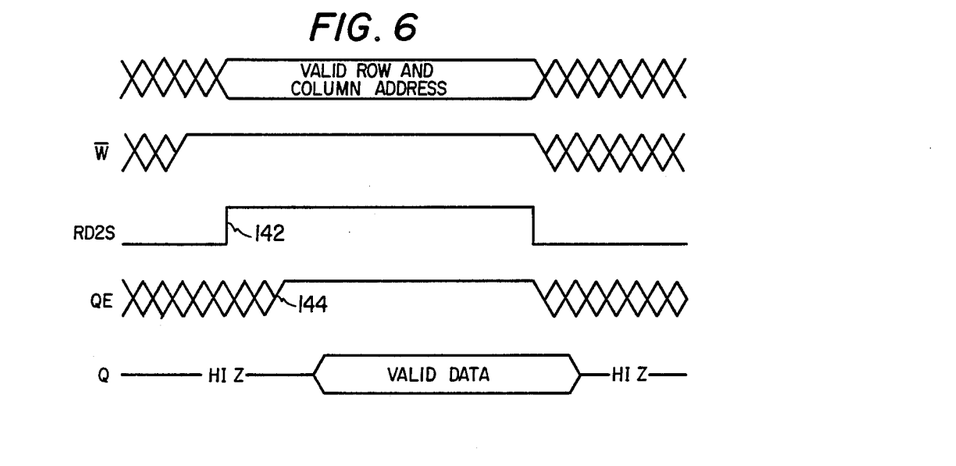
FIG. 6 illustrates a timing diagram for the Read operation of the RAM.

Referring now to FIG. 6, there is illustrated a timing diagram for the Read operation. The operation of these diagrams will be described in conjunction with FIG. 1. The read operation is initiated by placing the $\overline{W}$ signal in a logic high condition, indicating the read mode. After a valid row and column address are present on the buses 16 and 22, respectively, two hundred fifty-six bits of data from the information array 10 are present on the bus 24 and nine bits of parity information are present on the bus 28. When the row address and column address are valid, the RD2S control signal goes high, as indicated by a transition 142. At this time, multiplexers 32 and 38 interface with the buses 34 and 40. In addition, the P/$\overline{S}$ signal is low, selecting the syndrome generator configuration for the error syndrome/parity generator 48. In this configuration, the two hundred fifty-six bits of information, the nine bits of parity information and the output of the error position decode circuit 52 are input to the error correction circuit 54. This is static logic and, therefore, a corrected collective data word is output on the bus 58. The inverse of the gate signal $\overline{G1}$ is low such that this information is transmitted to the data bus 64 with the I/O select circuit 66 selecting the eight bit word therefrom in accordance with the column address. After a predetermined amount of time, this output enable signal QE is raised high, as indicated by a transition 144 and then the I/O circuit 70 is changed from a high impedance state to a low impedence state to allow the data to be extracted therefrom. Thereafter, RD2S goes low and another access cycle is required in order to obtain new information.

Figure 7:
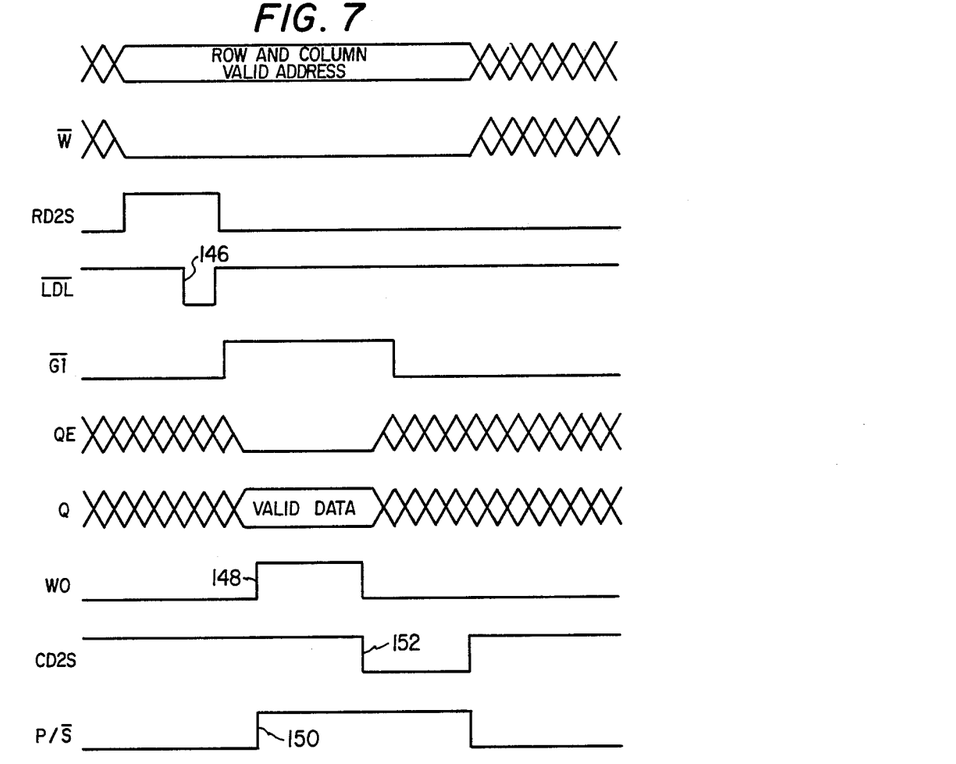
FIG. 7 illustrates a timing diagram for the Write operation of the RAM.

Referring now to FIG. 7, there is illustrated a timing diagram for the Write mode. In the Write mode, the $\overline{W}$ signal goes low prior to valid row and column addresses being latched therein. As soon as a valid row address is latched onto the bus 15 and decoded by the row address decoder 14, the signal RD2S goes high and the information output by the arrays 10 and 12 is input to the buses 34 and 40 through control of the multiplexers 32 and 38. In addition, the multiplexer 44 is controlled by the P/$\overline{S}$ signal which is low to input the parity information to the bus 46 and into the error syndrome generator 48, which is configured to generate the error syndrome. The information is then corrected with the error correction circuit 54 and output onto the bus 58. $\overline{G1}$ is low, transferring this corrected collective data word to the bus 64.

During this period, the I/O circuit 70 is in the high impedance state such that data can either be input to the bus 68 or output therefrom. The $\overline{LDL}$ signal then goes low, as indicated by a transition 146 to load the latches 72 and 74. When the $\overline{LDL}$ signal goes high, the $\overline{G1}$ signal goes high to latch the information in the latches 72 and 74 and to also isolate the bus 64 from the bus 58. This is the Read portion of the Write cycle.

After the corrected information at the desired row is stored in the latch 72, new data is then selectively written over this data. The output enable signal QE goes low, which changes the I/O signal 70 to input data from the exterior of the circuit to the bus 68 and to also place the I/O circuit 70 in a low impedence state. Data can then be input to the bus 68 and the I/O select circuit 66, which is controlled by the Y-select line 22 to place the data, which is an eight-bit data word, on the corresponding bus lines of the bus 64. The WO signal goes high, as indicated by a transition 148 to write the data on the select lines from the bus 64 to the corresponding ones of the latch bits 72. Simultaneous with the Write Over operation, the P/S signal goes high, as indicated by a transition 150 to interface the bus 36 with the bus 46 in addition to reconfiguring the error syndrome/parity generator 48 to generate parity bits. These parity bits are output to the bus 50 and through the multiplexers 78 to the bus 42. After the Write Over operation is complete, the CD2S signal goes low, as indicated by a transition 152 and the multiplexers 32 and 38 are configured to interface the buses 36 and 40 with the buses 24 and 28, respectively. This allows both the new 256-bit collective data word to be input to the information array 10 and the newly generated parity bits to be input to the parity array 12. A new cycle can then be initiated.

Figure 8:
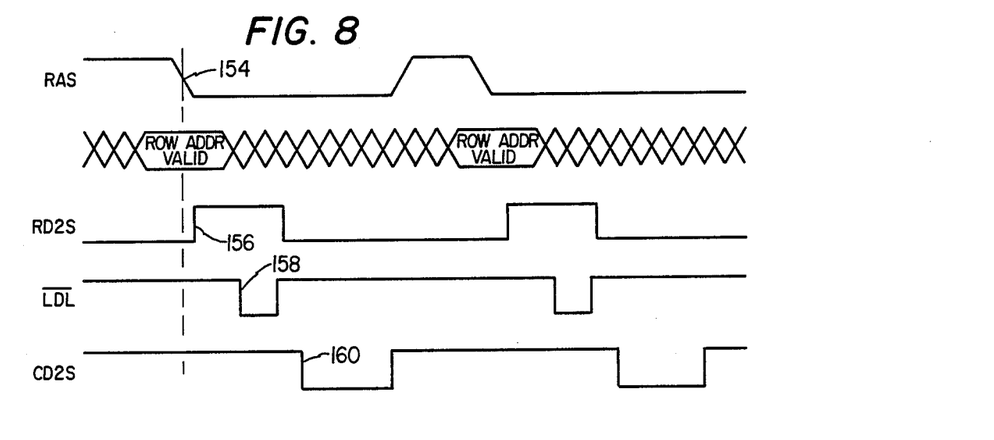
FIG. 8 illustrates a timing diagram for the Refresh operation of the RAM.

Referring now to FIG. 8, there is illustrated a timing diagram for the Refresh cycle. In the refresh cycle, $\overline{RAS}$ is first taken low, as indicated by a transition 154, to load the row address in the row address latch for input to the row address decoder 14. After the row address is applied to the word line bus 16, the RD2S signal is taken high, as indicated by a transition 156. This places the accessed information on the word lines output by the sense amps 26 and 30 onto the buses 34 and 40, respectively. Both the information portion of the coded data word and the parity portion are then corrected with the error correction circuit 54, as described above, such that the information portion appears on the bus 64 and the corrected parity portion appears on the bus 60. Both portions are then loaded into the respective latches 72 and 74 when the $\overline{LDL}$ signal goes low, as indicated by transition 158. After the $\overline{LDL}$ signal goes high, the CD2S signal goes low, as indicated by a transition 160 and the multiplexers 32 and 38 are controlled to input the information portion on bus 36 to array 10 and the parity portion on bus 76 to the array 12 through multiplexers 78 and bus 42.

In addition to providing a Refresh function, the Refresh cycle also corrects "soft" errors that are due to such things as alpha particles, etc. During this cycle, data is prevented from being input from the I/O bus 70 by maintaining a high impedance state therein. Thereafter, another row address can be input to refresh the next sequential row of information. This operation is controlled by the memory controller external to the RAM (not shown).

Since the refresh operation is facilitated by incrementing the row address, grouping of the data words into a single collective data word that has a length equal to the width of the array allows each row to be refreshed in one cycle. If the eight-bit data word were selected from the 256-bit row prior to error correction, refreshing of the data after correction thereof would require the column address to be incremented thirty-two times for each row.

Figure 9:
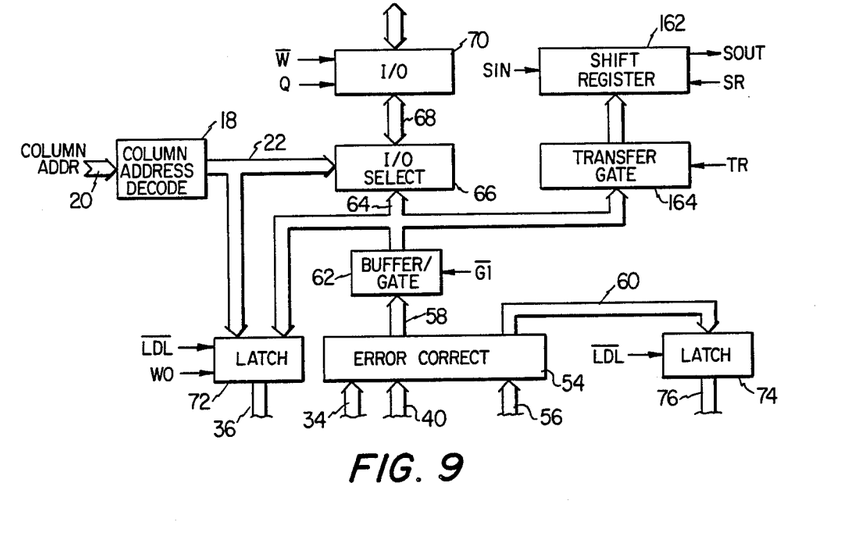
FIG. 9 illustrates a partial block diagram of the embodiment of FIG. 1 with a shift register incorporated for video RAM application.

Referring now to FIG. 9, there is illustrated an alternate embodiment of the invention illustrated in FIG. 1 for use in video RAM applications. In video systems, information displayed is segmented into discrete elements referred to as "pixels", the number of pixels per unit area determining the available resolution. Each of these pixels for a simple black and white system can be defined in terms of one bit of data; whereas, a more complex system utilizing pixels having different colors and intensity levels require significantly more bits of data. To display the pixel information stored in memory, data is read from memory in an organized interem storage medium in a serial format. At each horizontal line in the display scan, the pixel data is serially output and converted to video information. For example, the stored data for each black and white pixel corresponds to a predetermined position in the scan line and determines the video output for either a "white" or "black" level. The serial format in the pixel data is described in U.S. Pat. No. 4,322,663, issued to Redwine, U.S. Pat. No. 4,347,587, issued to Rao and U.S. patent application Ser. No. 567,040, filed on Dec. 30, 1983, all assigned to Texas Instruments Incorporated.

To utilize the system of the present invention with a video application, a 256 bit serial shift register 162 has the parallel inputs thereof interfaced with the output bus 64 through a transfer gate 164. The transfer gate 164 is controlled by a transfer signal (TR) which transfers all 256 bits of information output from the error correct circuit 54 to the shift register 162. Once loaded, this data is then clocked through the shift register with a shift register clock (SR). During the time in which the data is being shifted out of the shift register 162, another row of information is being accessed and placed onto bus 64.

With the error correction circuit of the present invention, a defective row of memory elements can be accommodated without requiring the use of a redundant row. Although redundancy is commonly utilized to repair a defective memory, this redundancy can be cumbersome when utilized with a serial shift register. This is due to the fact that a redundant column of memory elements is normally physically disposed adjacent the normal operating array. For normal array operations, it is only necessary to modify the decode lines for selecting the redundant column since an addressed memory element or a group of memory elements is output from the I/O select circuit 66 in accordance with the column address.

Although the physical location of a redundant column in a memory array is of little consequence when addressing a particular memory element in that column, it is important when considering the physical location of the redundant column relative to the associated output shift bit. Since memories are "bit mapped", it is important that adjacent pixels correspond to adjacent memory elements. Therefore, in addition to replacing a defective column with a redundant column it is also necessary to delete the shift bit associated with the redundant column from the shift register and bypass this shift bit. With the device of FIG. 9, a defective column is corrected for as the result of having associated parity information, such that it is not necessary to physically remove the defective column. Therefore, the bit output to the corresponding shift bit in the shift register 162 will be corrected.

In summary, there has been provided a Random Access Memory that has an error detection/correction capability. Data words are configured as a single collective data word and combined with associated parity information as a coded data word which is stored in a memory array, the coded data word having a length equal to the bit width of the array. During the Read operation, the collective data word and the parity information are accessed and processed through a Hamming code error detection/correction circuit to provide a corrected coded data word. During the Write operation, data is first read from the arrays corrected and then stored. The collective data word in the corrected coded data word is then written over with a new data word to form a new collective data word and new parity information generated from this new collective data word. The parity information is generated with a circuit that is common to the error code detection/correction circuit since the function for generating an error syndrome and parity information is similar. This new collective data word written and the new parity information is then written into the memory.

Although the preferred embodiment has been described in detail, it should be understood that various changes, substitutions and alterations can be made therein without departing from the spirit and scope of the invention as defined by the appended claims.

What is claimed is:

1. A read/write memory, comprising:
   a plurality of data memory cells arranged in rows and columns;
   a plurality of code memory cells arranged in rows and columns; each row of said code memory cells for storing an error detection code corresponding to a row of said data memory cells;
   row addressing means for selecting a row of said data memory cells and the corresponding row of said code memory cells;
   sensing means for sensing the contents of each data memory cell and each said code memory cell in the row selected by said row addressing means and for writing the contents of said data memory cells and said code memory cells in the selected row;
   error detection logic, connected to said sensing means, for detecting an error in the sensed contents of said data memory cells and the contents of the associated code memory cells by way of a predetermined code;
   error correction logic, connected to said error detection logic and to said sensing means, for modifying the sensed output for a data memory cell corresponding to an error detected by said error detection logic;
   column addressing means for selecting a data memory cell to be read or written responsive to a column address signal;
   input/output means, connected to said column addressing means, for externally presenting the modified contents of the selected data memory cell in a read cycle, and for receiving data to be written to the selected data memory cell in a write cycle;
   read/write logic, for controlling said input/output means to present data responsive to a read signal, and for controlling said input/output means to receive data in a write cycle;
   a data latch having a bit position for each data memory cell in a row, connected to the output of said error correction logic, for storing the output of said error correction logic, and connected to said input/output means and said read/write logic so that, in a write cycle, the bit position corresponding to the data memory cell selected by said column addressing means therewithin is rewritten with the data received by said input/output means;
   a data rewrite bus, connected to said data latch and to said sensing means, for communicating the contents of said data latch to said sensing means for application to the data memory cells in the selected row; and
   code generation means, connected to said data rewrite bus and to said sensing means, for generating the contents of the code memory cells for the selected row, based upon the contents of said data latch, for application to the code memory cells in the selected row.

2. The memory of claim 1, wherein said error detection means comprises:
   error syndrome logic, connected to said sensing means, for calculating an error syndrome according to a predetermined code, based upon the sensed contents of the data memory cells and the code memory cells in the selected row; and
   an error position decoder, connected to the output of the error syndrome logic, for presenting to said error correction means the location of the data memory cell in error.

3. The memory of claim 1, wherein said error correction logic is also for modifying the sensed contents of said code memory cells in the event of an error therein; and further comprising:
   a code latch, connected to the output of said error correction logic, having a bit position for each code memory cell in said row, for storing the modified contents of the sensed code memory cells in the selected row;
   a code rewrite bus, connected to said sensing means and to said code latch, for communicating the contents of said code latch to said sensing means for application to said code memory cells in the selected row.

4. The memory of claim 3, wherein said sensing means is also for applying the contents of said data latch to said data memory cells in the selected row and for applying the contents of said code latch to said code memory cells in the selected row after each read cycle, thereby refreshing said memory cells in the selected row.

5. The memory of claim 4, wherein said sensing means is also for applying the contents of said data latch to said data memory cells in the selected row and for applying the contents of said code latch to said code memory cells in the selected row in a refresh cycle, thereby refreshing said memory cells in the selected row;
   and wherein said input/output means and said column addressing means are disabled during said refresh cycle.

6. The memory of claim 1, wherein said column addressing means selects a plurality of said data memory cells.

7. The memory of claim 1, wherein said memory cells are dynamic read/write memory cells.

8. A read/write memory, comprising:
   a plurality of data memory cells arranged in rows and columns;
   a plurality of code memory cells arranged in rows and columns, each row of said code memory cells for storing an error detection code corresponding to a row of said data memory cells;
   row addressing means for selecting a row of said data memory cells and the corresponding row of said code memory cells;
   sensing means for sensing the contents of each data memory cell and each said code memory cell in the row selected by said row addressing means and for writing the contents of said data memory cells and said code memory cells in the selected row;

parity/syndrome logic, connected to said sensing means, operative during a first part of the memory cycle to calculate an error syndrome according to a predetermined code based upon the sensed contents of the sensed data memory cells and the code memory cells from the selected row;

an error position decoder, connected to the output of the parity/syndrome logic, for determining the location of the data memory cell in error based upon the error syndrome calculated by said parity/syndrome logic;

error correction logic, connected to said error position decoder and to said sensing means, for modifying the sensed output of a data memory cell corresponding to an error detected by said parity/syndrome logic;

column addressing means for selecting a data memory cell to be read or written responsive to a column address signal;

input/output means, connected to said column addressing means, for externally presenting the modified contents of the selected data memory cell in a read cycle, and for receiving data to be written to the selected data memory cell in a write cycle;

read/write logic, for controlling said input/output means to present data responsive to a read signal, and for controlling said input/output means to receive data in a write cycle;

a data latch having a bit position for each data memory cell in a row, connected to the output of said error correction logic, for storing the output of said error correction logic, and connected to said input/output means and said read/write logic so that, in a write cycle, the bit position corresponding to the data memory cell selected by said column addressing means therewithin is rewritten with the data received by said input/output means; and a data rewrite bus, connected to said data latch and to said sensing means, for communicating the contents of said data latch to said sensing means for application to the data memory cells in the selected row;

wherein said parity/syndrome logic is connected to said data rewrite bus, and is operative during a second part of the memory cycle for calculating the contents of said code memory cells in the selected row, based upon the contents of said data latch, for application to the code memory cells in the selected row.

9. The memory of claim 8, wherein said column addressing means selects a plurality of said data memory cells.

10. The memory of claim 8, wherein said memory cells are dynamic read/write memory cells.

11. The memory of claim 8, wherein said predetermined code is a Hamming code.

12. The memory of claim 8, further comprising:

a data register having a bit position for each of the data memory cells in the selected row;

transfer means, connected between said output of said error correction logic and said data register, for communicating the output of said error correction logic to said data register responsive to a transfer signal and for isolating said data register from said output of said error correction logic in the absence of said transfer signal; and a serial output, connected to said data register, for serially presenting the contents of said data register responsive to a series of clock signals.

* * * * *